United States Patent
Rathay et al.

(10) Patent No.: US 12,031,501 B2
(45) Date of Patent: Jul. 9, 2024

(54) COOLING SYSTEM FOR AN ENGINE ASSEMBLY

(71) Applicant: General Electric Company, Schenectady, NY (US)

(72) Inventors: Nicholas William Rathay, Rock City Falls, NY (US); Corey Bourassa, Mechanicville, NY (US); Brian Magann Rush, Niskayuna, NY (US); William Dwight Gerstler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 929 days.

(21) Appl. No.: 16/698,287

(22) Filed: Nov. 27, 2019

(65) Prior Publication Data
US 2021/0156339 A1 May 27, 2021

(51) Int. Cl.
*F02K 1/82* (2006.01)
*F02K 7/10* (2006.01)
(Continued)

(52) U.S. Cl.
CPC .............. *F02K 1/822* (2013.01); *F02K 7/10* (2013.01); *F28D 7/163* (2013.01);
(Continued)

(58) Field of Classification Search
CPC . F28F 7/02; F28F 2210/02; F28D 2021/0021; F28D 9/0012;
(Continued)

(56) References Cited

U.S. PATENT DOCUMENTS 3,104,652 A * 9/1963 Tillequin .............. F22B 1/1823
165/162
3,228,464 A * 1/1966 Stein ....................... F28F 3/046
165/166
(Continued)

FOREIGN PATENT DOCUMENTS

RU  2088495  8/1997
WO  02090482  9/2007
(Continued)

OTHER PUBLICATIONS

On-Wing Washing System Using Injected Water or Detergent Which Penetrates Deep into the Engine, Cleaning Performance Stealing Contaminants, Aero Jet Wash L.L.C.; downloaded Dec. 2016; http://www.aerojetwash.com/services.html.

*Primary Examiner* — Craig Kim
(74) *Attorney, Agent, or Firm* — McGarry Bair PC

(57) ABSTRACT

A cooling system includes a conduit extending from an upstream end to a downstream end and retains a gas. A heat exchanger is fluidly coupled with and disposed within a surface of the conduit. A portion of the gas is directed into the heat exchanger via one or more passages extending between the conduit and the heat exchanger, and a portion of the gas is directed out of the heat exchanger via the one or more passages. The heat exchanger directs cooling fluid in one or more directions within the heat exchanger along one or more passageways of plural passageways. The heat exchanger directs the portion of the gas in one or more directions within the heat exchanger along one or more other passageways of the plural passageways. The heat exchanger cools the gas by exchanging heat from the gas to the cooling fluid within the heat exchanger.

20 Claims, 10 Drawing Sheets

(51) Int. Cl.
*F28D 7/16* (2006.01)
*F28D 21/00* (2006.01)

(52) U.S. Cl.
CPC ...... *F05D 2220/10* (2013.01); *F05D 2240/14* (2013.01); *F05D 2260/213* (2013.01); *F28D 2021/0021* (2013.01); *F28D 2021/0026* (2013.01)

(58) Field of Classification Search
CPC .... F28D 2021/0026; F28D 7/163; F02K 7/10; F02K 1/822; F02C 7/12; F02C 7/14; F02C 7/16; F02C 7/18; F02C 7/185
See application file for complete search history.

(56) References Cited

U.S. PATENT DOCUMENTS

| | | | |
|---|---|---|---|
| 3,663,346 A * | 5/1972 | Schoen | E04B 1/19 |
| | | | 428/116 |
| 3,925,941 A * | 12/1975 | Pearce | A63B 9/00 |
| | | | 52/80.2 |
| 3,955,620 A * | 5/1976 | Artemov | F28F 9/00 |
| | | | 165/145 |
| 5,149,018 A | 9/1992 | Clark | |
| 5,661,117 A | 8/1997 | Dufresne | |
| 5,873,239 A | 2/1999 | Culver | |
| 5,899,217 A | 5/1999 | Testman | |
| 6,135,715 A * | 10/2000 | Correia | F01D 5/20 |
| | | | 415/173.1 |
| 7,069,980 B2 * | 7/2006 | Hofbauer | F28F 1/022 |
| | | | 165/150 |
| 7,140,174 B2 | 11/2006 | Johnson | |
| 7,866,377 B2 | 1/2011 | Slaughter | |
| 7,871,578 B2 | 1/2011 | Schmidt | |
| 8,127,555 B2 | 3/2012 | Jarmon et al. | |
| 8,235,101 B2 * | 8/2012 | Taras | F28F 27/02 |
| | | | 62/238.7 |
| 8,522,560 B2 | 9/2013 | Jarmon et al. | |
| 8,628,627 B2 | 1/2014 | Sales | |
| 9,108,282 B2 | 8/2015 | Guinan et al. | |
| 9,234,626 B2 * | 1/2016 | Simmons | B21D 26/021 |
| 10,209,009 B2 | 2/2019 | Gerstler | |
| 10,934,936 B2 * | 3/2021 | Snyder | F02C 7/12 |
| 10,955,200 B2 * | 3/2021 | Sabo | F28D 7/1623 |
| 10,982,553 B2 * | 4/2021 | Rathay | F01D 5/20 |
| 11,213,923 B2 * | 1/2022 | Stewart, Jr. | F28F 9/22 |
| 11,561,048 B2 * | 1/2023 | Erno | F28D 7/1669 |
| 2007/0125520 A1 | 6/2007 | Nutsos | |
| 2011/0302928 A1 | 12/2011 | Mudawar | |
| 2015/0014323 A1 * | 1/2015 | Loukus | F41H 7/044 |
| | | | 428/34.1 |
| 2015/0159122 A1 | 6/2015 | Tibbetts et al. | |
| 2015/0275762 A1 | 10/2015 | Kenyon | |
| 2016/0202003 A1 * | 7/2016 | Gerstler | F28F 21/086 |
| | | | 165/165 |
| 2016/0207111 A1 | 7/2016 | Robrecht et al. | |
| 2016/0230592 A1 | 8/2016 | Saenz | |
| 2017/0057614 A1 | 3/2017 | Janeke | |
| 2017/0137123 A1 | 5/2017 | Janeke | |
| 2017/0367218 A1 * | 12/2017 | Gerstler | F28D 9/0093 |
| 2018/0017331 A1 | 1/2018 | Veilleux, Jr. et al. | |
| 2018/0299066 A1 | 10/2018 | Erno | |
| 2019/0017391 A1 | 1/2019 | Dyson | |
| 2019/0024987 A1 * | 1/2019 | Moore | B33Y 80/00 |
| 2019/0063751 A1 * | 2/2019 | Ryon | F28D 15/046 |
| 2020/0173291 A1 * | 6/2020 | Rathay | F01D 5/20 |
| 2020/0363133 A1 * | 11/2020 | Gerstler | F28D 7/005 |
| 2021/0087971 A1 * | 3/2021 | Emmanouil | F02C 7/04 |
| 2021/0156339 A1 * | 5/2021 | Rathay | F02K 1/822 |
| 2021/0293483 A1 * | 9/2021 | Gerstler | B33Y 10/00 |
| 2022/0111974 A1 * | 4/2022 | Wickersham | F02K 7/10 |

FOREIGN PATENT DOCUMENTS

| | | | |
|---|---|---|---|
| WO | 2007102738 | 9/2007 | |
| WO | 2016057443 | 4/2016 | |
| WO | WO-2019163173 A1 * | 8/2019 | ............... B64C 1/38 |
| WO | WO-2022197253 A1 * | 9/2022 | |

* cited by examiner

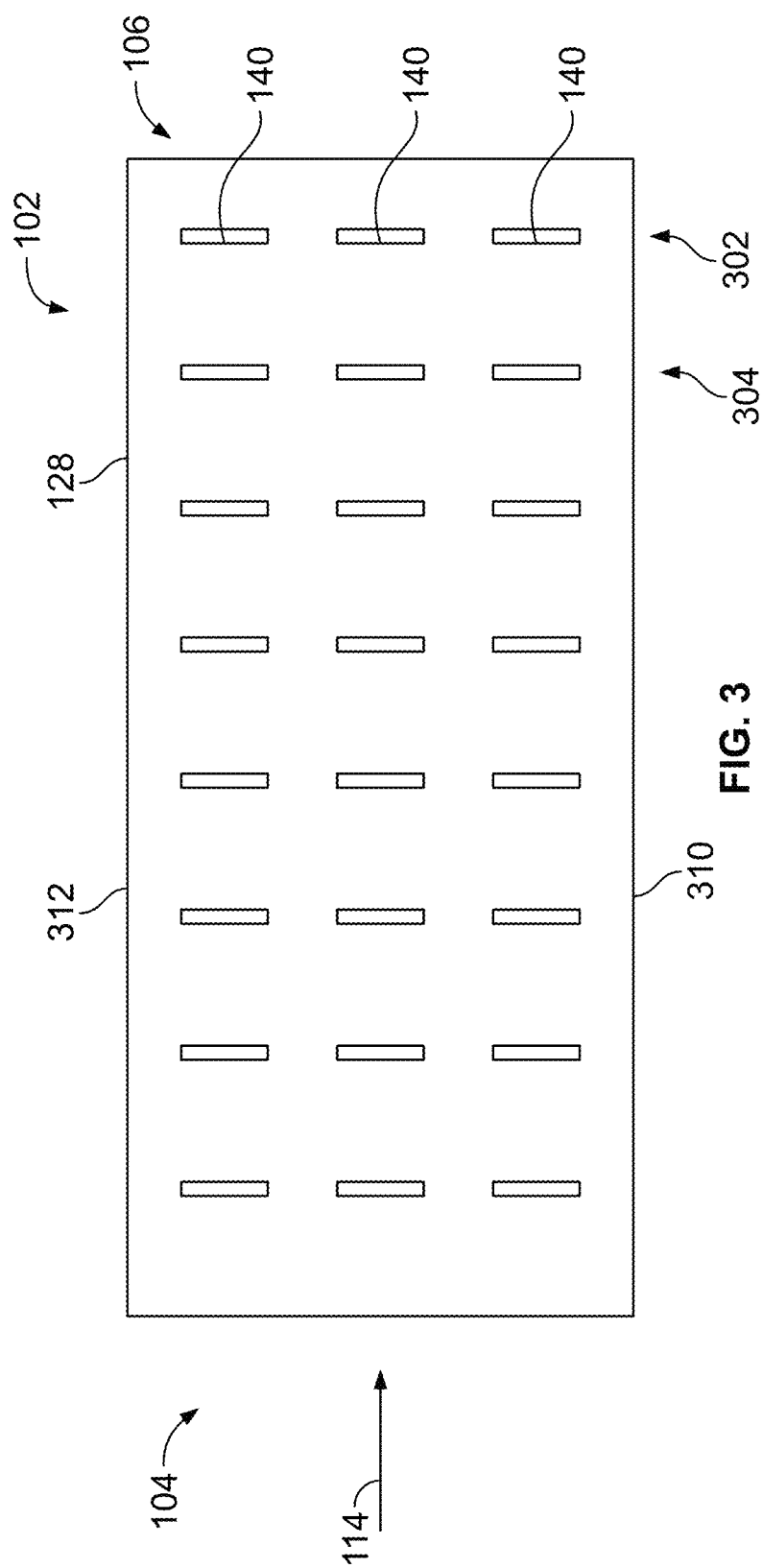

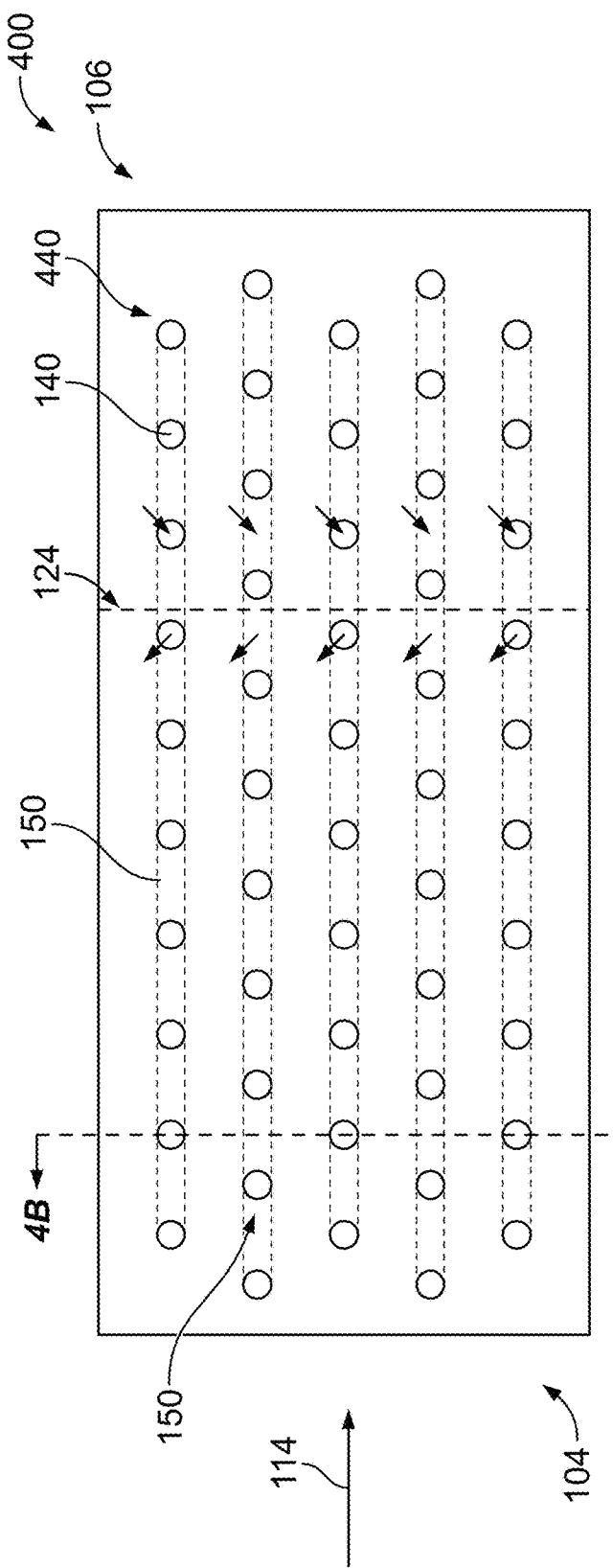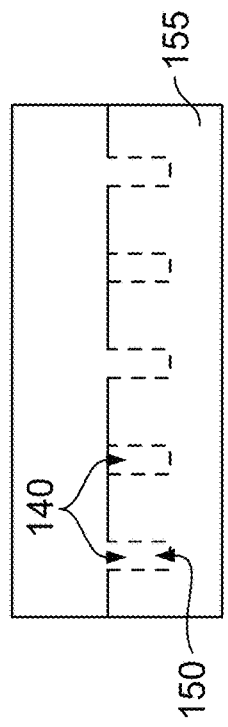

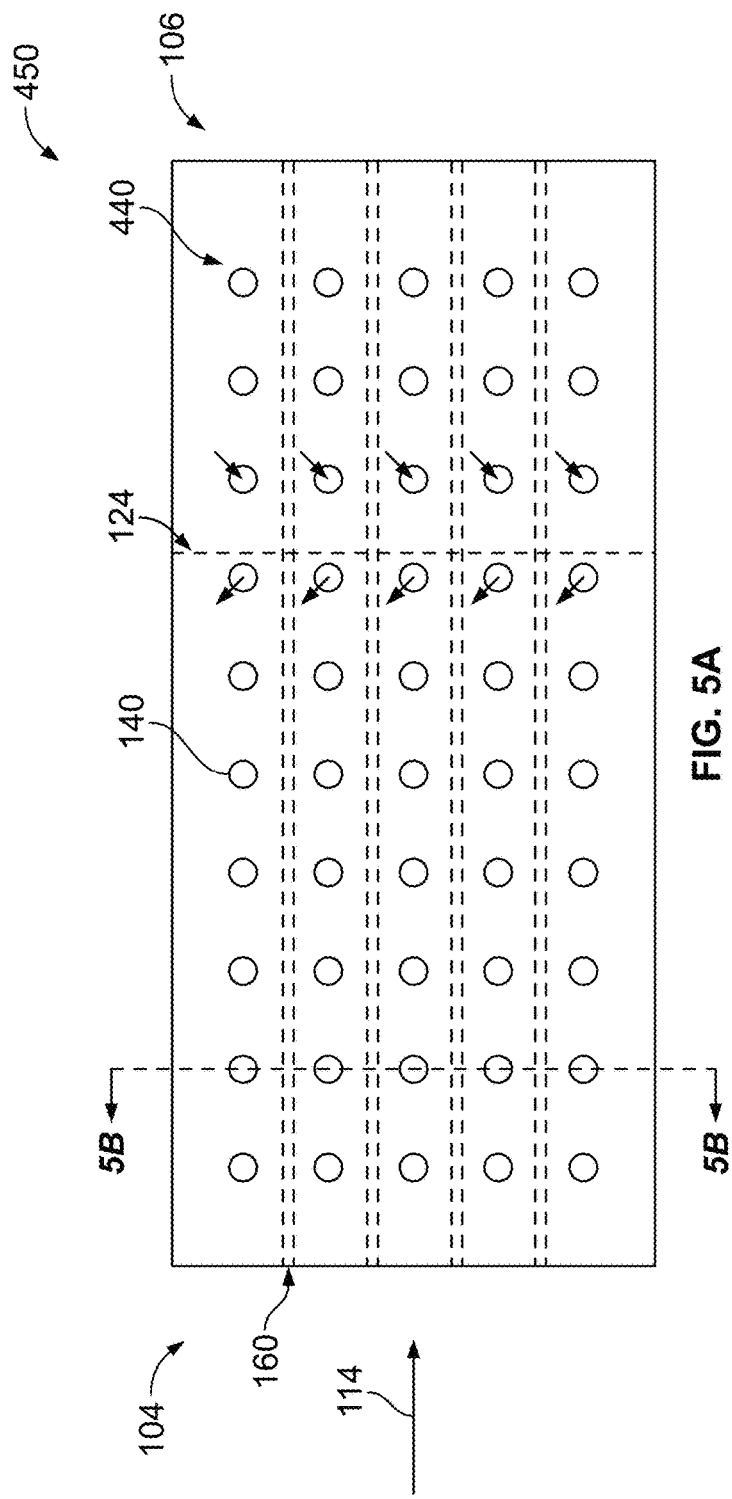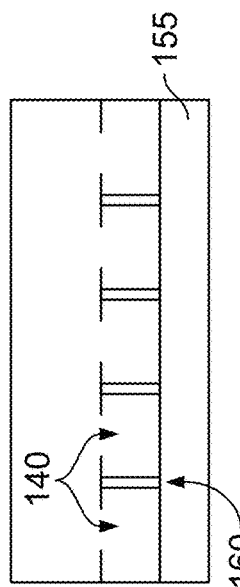

COOLING SYSTEM FOR AN ENGINE ASSEMBLY

FIELD

The subject matter described herein relates to cooling systems.

BACKGROUND

Engine systems can be subjected to increased heat loads when an engine is operating. To protect engines and engine components from damage, cooling fluid may be directed in and/or out of the engine system. Component temperatures can be managed through cooling systems with the goal of balancing component life and engine efficiency. Improved efficiency may be achieved through increasing the firing temperature of the engine system, reducing the cooling flow, or a combination thereof.

As one example, cooling a supersonic engine may be challenging. Due to increasing flight speeds, surfaces within the engine systems may be exposed to high gas temperatures. Additionally, supersonic engines rely on a cascade of supersonic engine-generated shockwaves to increase gas pressure within the system for combustion. The shockwaves may create regions of high heat transfer where they impinge against the engine surfaces. The impinging shockwaves may increase a surface temperature of the regions where they impinge against the surfaces. Additionally, supersonic engines may have limited availability of cooling fluid. Traditional film cooling techniques that are employed within typical gas turbine assemblies may not be used.

BRIEF DESCRIPTION

In one or more embodiments, a cooling system includes a conduit extending from an upstream end to a downstream end and retains a gas. A heat exchanger is fluidly coupled with and disposed within a surface of the conduit. A portion of the gas is directed into the heat exchanger via one or more passages extending between the conduit and the heat exchanger, and a portion of the gas is directed out of the heat exchanger via the one or more passages. The heat exchanger directs cooling fluid in one or more directions within the heat exchanger along one or more passageways of plural passageways. The heat exchanger directs the portion of the gas in one or more directions within the heat exchanger along one or more other passageways of the plural passageways. The heat exchanger cools the gas by exchanging heat from the gas to the cooling fluid within the heat exchanger.

In one or more embodiments, a method includes directing cooling fluid in one or more directions within a heat exchanger along one or more of plural passageways of the heat exchanger. The heat exchanger is disposed within a surface of a conduit extending from an upstream end to a downstream end. The conduit retains a gas. Heat is exchanged from the gas to the cooling fluid within the heat exchanger. A portion of the gas is directed into the heat exchanger via one or more passages extending between the conduit and the heat exchanger, and a portion of the gas is directed out of the heat exchanger via the one or more passages. The heat exchanger directs the gas in one or more directions within the heat exchanger along one or more other passageways of the plural passageways.

In one or more embodiments, a cooling system includes a conduit extending from an upstream end to a downstream end and retains a gas. A heat exchanger is fluidly coupled with and disposed within a surface of the conduit. The heat exchanger includes plural unit cells fluidly coupled with each to form plural passageways within the heat exchanger. An inlet passage extends between the conduit and the heat exchanger and directs the gas from the conduit toward the heat exchanger. An outlet passage extends between the conduit and the heat exchanger and directs the gas from the heat exchanger toward the conduit. The heat exchanger directs cooling fluid in one or more directions within the heat exchanger along one or more passageways of the plural passageways, and directs the gas in one or more directions within the heat exchanger along one or more other passageways of the plural passageways. The conduit receives a supersonic engine-generated shockwave that impinges on the surface of the conduit at an impingement location. The inlet passage is an opening of the surface at a position that is downstream of the impingement location, and the outlet passage is an opening of the surface at a position that is upstream of the impingement location.

BRIEF DESCRIPTION OF THE DRAWINGS

The present inventive subject matter will be better understood from reading the following description of non-limiting embodiments, with reference to the attached drawings, wherein below:

FIG. 3 illustrates a top view of a conduit of the cooling system shown in FIG. 2, in accordance with one embodiment;

FIG. 4A illustrates a top view of a conduit of a cooling system in accordance with one embodiment, FIG. 4B illustrates a cross-sectional view of the conduit of the cooling system shown in FIG. 4A;

FIG. 5A illustrates a top view of a conduit of a cooling system in accordance with one embodiment;

FIG. 5B illustrates a cross-sectional view of the conduit of the cooling system shown in FIG. 5A;

DETAILED DESCRIPTION

One or more embodiments of the inventive subject matter described herein provide systems and methods that provide a cooling system to reduce a temperature of a portion of an engine assembly. In one or more embodiments, the engine assembly may be a scramjet or ramjet engine assembly, or any alternative system that may be used to power a hypersonic vehicle. The cooling system may include a conduit and at least one heat exchanger that may be disposed within a surface of the conduit. The heat exchanger may include plural passageways that may be fluidly coupled via one or more unit cells that may change direction of the one or more fluids within the heat exchanger. As one example, unit cells may be structures with symmetry that enable the unit cells to be replicated in multiple directions to form a system of unit cells. The unit cells may be replicated in the x, y, and/or z directions in a cartesian coordinate system. The passageways, the unit cells, the system of unit cells, and any alternative cooling channels of the heat exchanger may be additively manufactured.

A cooling fluid may move along at least one of the plural passageways. A portion of a gas retained in the conduit may be directed from the conduit into the heat exchanger and out of the heat exchanger via one or more passages. The gas may move along at least one other passageway of the plural passageways and exchange thermal energy with the cooling fluid. For example, the portion of the gas that is directed out of the heat exchanger has a temperature that may be less than a temperature of the portion of the gas that is directed into the heat exchanger.

In one or more embodiments, operation of the engine assembly may generate shockwaves within the system. The engine assembly may be used within an aircraft that may travel at supersonic and/or hypersonic flight speeds. The shockwaves may also be referred to as hypersonic and/or supersonic engine-generated shockwaves. The supersonic engine-generated shockwaves may impinge on one or more different surfaces of the conduit. An increase in pressure of the gas retained in the conduit across the shockwave promotes movement of the gas into and out of the heat exchanger. Additionally, the reduced temperature of the portion of the gas that is directed out of the heat exchanger and into the conduit (e.g., relative to the temperature of the portion of the gas directed into the heat exchanger) reduces a temperature of the conduit. Additionally, the engine-generated shockwaves may promote boundary layer separation of one or more surfaces of the conduit. The promotion of movement of the gas into and out of the heat exchanger (e.g., suction of fluid into the passageways downstream of a shockwave) may mitigate boundary layer separation.

Figure 1:
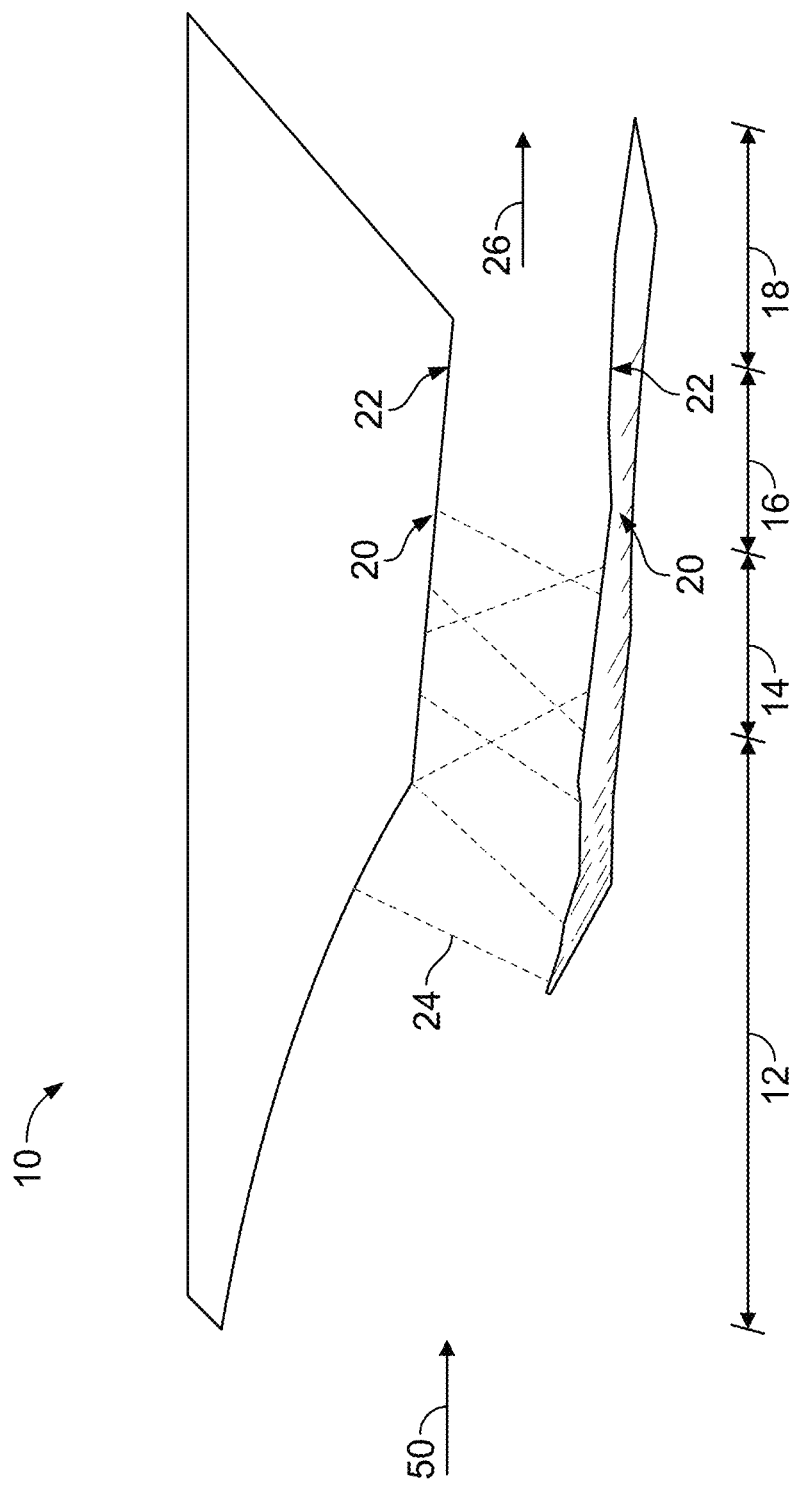
FIG. 1 illustrates a scramjet engine assembly in accordance with one embodiment.

FIG. 1 illustrates a scramjet engine assembly 10 in accordance with one embodiment. The scramjet engine assembly 10 includes an inlet 12 through which air enters the engine assembly 10 in a direction 50. The air travels in the direction 50 from the inlet 12, through an isolator 14, through a combustor 16, through a nozzle 18, to an exhaust 26. The engine assembly 10 may include plural fuel injection stages 20, 22 at the combustor 16. One or more supersonic engine-generated shockwaves 24 may impinge on one or more surfaces of the engine assembly 10 within the inlet 12, the isolator 14, and/or the combustor 16. Optionally, the engine assembly 10 may represent a ramjet engine assembly, or any other power and/or engine system that may be used to power hypersonic flight, movement, travel, or the like.

Figure 2:
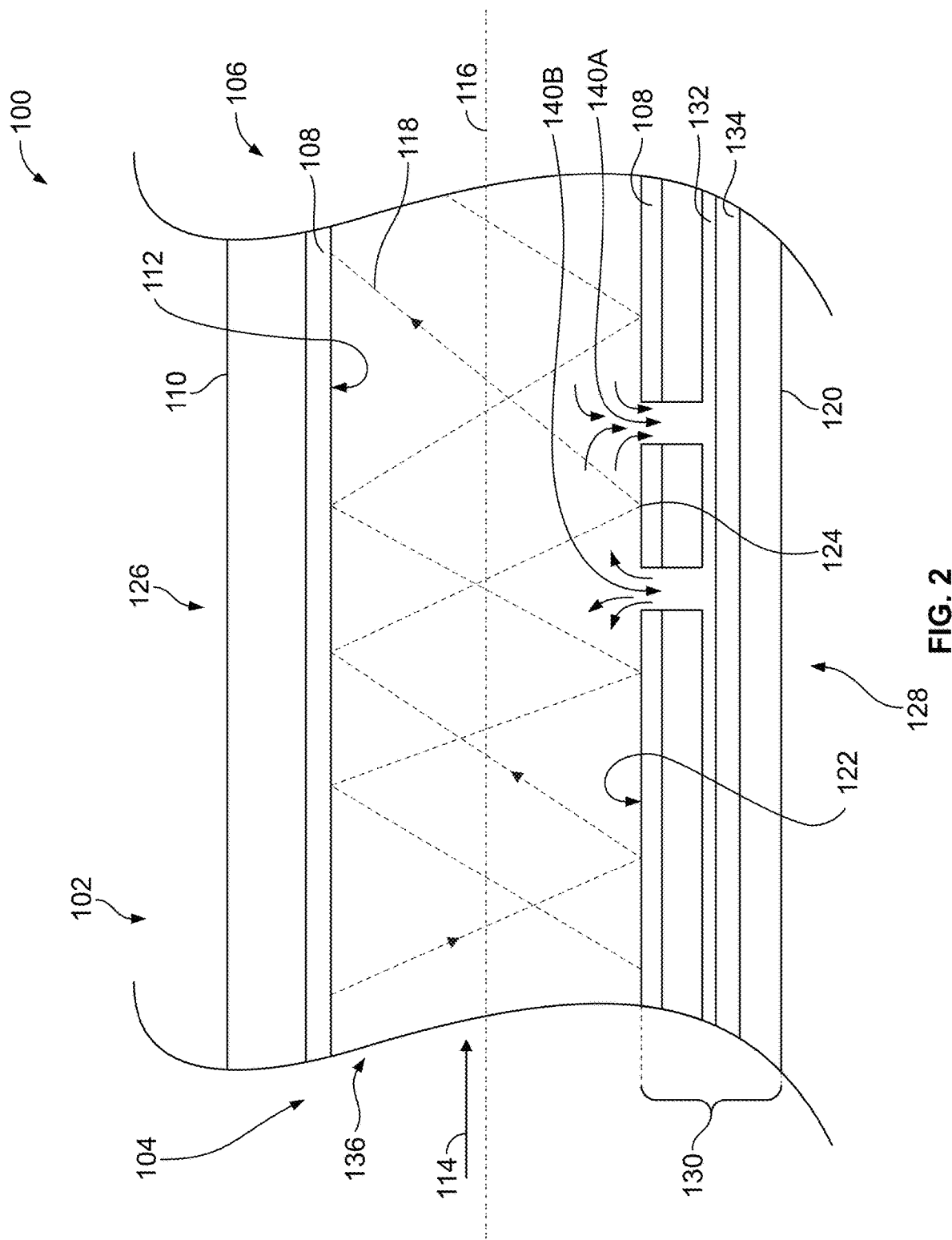
FIG. 2 illustrates a cross-sectional view of a cooling system in accordance with one embodiment.

FIG. 2 illustrates a cross-sectional view of a cooling system 100 in accordance with one embodiment. The cooling system 100 includes a conduit 102 that retains a gas. The gas may be air, argon, nitrogen, or the like. The conduit 102 extends from an upstream end 104 to a downstream end 106 along an axis 116 in a direction 114. As one example, the conduit 102 may represent a portion and/or section of the inlet 12 (shown in FIG. 1), a portion and/or section of the isolator 14, and/or a portion and/or section of the combustor 16. Optionally, the conduit 102 may represent any passage or pathway of the engine assembly 10 that may retain a gas. In one or more embodiments, the conduit 102 may have any uniform and/or non-uniform quadrilateral cross-sectional shape along the axis 116 between the upstream end 104 and the downstream end 106. Additionally or alternatively, the conduit 102 may be a closed body that extends around the axis 116, with one or more openings at one or both of the upstream and downstream ends 104, 106.

The conduit 102 includes a first surface 126 and a second surface 128, with a passage 136 of the conduit 102 extending at least therebetween the first and second surfaces 126, 128 and the upstream and downstream ends 104, 106 about the axis 116. The first surface 126 includes an inner surface 112 and an outer surface 110, and the second surface 128 includes an inner surface 122 and an outer surface 120. In one or more embodiments, the first and second surfaces 126, 128 may represent any surface of the engine assembly 10 illustrated in FIG. 1.

In one or more embodiments, the conduit 102 may include a thermal barrier coating 108 that may be applied to one or both of the first and second surfaces 126, 128, or any other surface of the conduit 102. For example, the thermal barrier coating 108 may provide a thermal protection to the first and second surfaces 126, 128 of the conduit 102. Optionally, the thermal barrier coating 108, or another barrier coating may be strategically applied to one or more regions of the conduit 102 to preserve the integrity of the material of the conduit 102.

The cooling assembly 100 includes a heat exchanger 130 that is fluidly coupled with and disposed within the conduit 102. In the illustrated embodiment of FIG. 2, the heat exchanger 130 is disposed within the second surface 128 of the conduit 102. Additionally or alternatively, the heat exchanger 130 may extend around the axis 116 and be disposed within the first and second surfaces 126, 128 of the conduit 102. Optionally, the first and second surfaces 126, 128 may be separate bodies or entities, and a first heat exchanger may be disposed in the first inner surface 126 of the conduit 102, and a different, second heat exchanger may be disposed in the second surface 128. Optionally, one or more heat exchangers may be disposed at any position and/or within one or more surfaces of the conduit 102 of the cooling system 100.

The heat exchanger 130 is disposed within the conduit 102 such that the heat exchanger 130 is contained between the inner and outer surfaces 122, 120 of the second surface 128 of the conduit 102. For example, the heat exchanger 130 does not extend into the passage 136 of the conduit 102. The heat exchanger 130 may extend in one or more directions within the second surface 128.

The cooling system 100 includes one or more passages 140 that are openings within the second surface 128 of the conduit 102 that fluidly couple the conduit 102 with the heat exchanger 130. For example, some of the gas that is retained within the conduit 102 may be directed into and out of the heat exchanger 130 via the one or more passages 140. The passages will be described in more detail below. In one or more embodiments, the passages 140 may be formed in the thermal barrier coating 108, may be an extension of the heat exchanger 130, or any combination therein. Optionally, the passages 140 may be angled relative to each other passage 140 to direct gas going into the heat exchanger 130 and the gas coming out of the heat exchanger 130 in one or more different directions. For example, the passages 140 may be arranged to generate counter-rotating streams of gas, such as vortices, within the conduit 102.

The heat exchanger 130 includes plural passageways 132, 134 that direct one or more fluids in plural different directions within the heat exchanger 130. At least one of the passageways 132 directs a portion of the gas within the heat exchanger 130, and another of the plural passageways 134 directs cooling fluid within the heat exchanger 130. In one or more embodiments, the cooling fluid may be fuel that may be used to operate the engine assembly 10. Optionally, the cooling fluid may be any alternative fluid. In one or more embodiments, the heat exchanger 130 may be referred to as an air-and-cooling fluid heat exchanger such that the heat exchanger may exchange thermal energy (e.g., heat) between the air that moves in the passageway 132 and the cooling fluid that moves in the other passageway 134. For example, the heat exchanger 130 may be a dual fluid heat exchanger that may include plural passageways that may be fluidly coupled and/or separate from each other in any combination to direct two different fluids that are fluidly separate from each other in plural directions. Optionally, the heat exchanger 130 may include a third fluid or third mechanism that may be used to control a temperature of the gas (e.g., air) and/or a temperature of the cooling fluid (e.g. the fuel) within the heat exchanger 130.

The passageways 132, 134 may be fluidly coupled with each other in any combination via one or more structures. As one example, the structures may be unit cells that may be used to control a direction of flow of the gas and the cooling fluid within the heat exchanger 130 along the one or more different passageways. Optionally, the structures may be walls, channels, or the like. In one or more embodiments, the passageways 132, 134 may be formed by fluidly coupling unit cells, wall, and/or channels in any combination, any pattern, any random configuration, or the like.

In the illustrated embodiment of FIG. 2, the passageway 132 of the gas is shown as a general space to indicate where the gas may flow within the heat exchanger, and the passageway 134 of the cooling fluid is shown as another general space to indicate where the cooling fluid may flow within the heat exchanger 130. Optionally, the passageways 132, 134 may change positions such that a portion of the passageway 134 may be disposed closer to the inner surface 122 than the passageway 132. Optionally, the passageways 132, 134 may have any intermingling configuration within the surface 128 of the conduit 102. Plural embodiments of unit cells and passageways will be described in more detail below.

During operation of the engine assembly 10, one or more hypersonic and/or supersonic engine-generated shockwaves 118 may be generated. The shockwaves 118 may impinge on the inner surfaces 112, 122 of the conduit 102. For example, the shockwaves 118 may bounce, hit, or impinge one inner surface 112 and may ricochet toward the other inner surface 122, where the shockwave may impinge or hit the other inner surface 122. Generation of the shockwaves may be based on the operating speed of the engine assembly 10.

The shockwaves 118 may impinge on the inner surface 122 at impingement locations, such as impingement location 124. In the illustrated embodiment of FIG. 2, one of the passages 140 (e.g., an inlet passage 140A) is disposed downstream of the impingement location 124, and another passage 140 (e.g., an outlet passage 140B) is disposed upstream of the impingement location 124 along the direction 114 the gas moves within the conduit 102. The conduit 102 at the impingement location 124 has a heat flux that is greater than a heat flux at another location of the conduit 102, such as another location where a shockwave does not impinge on the surface of the conduit 102. For example, the cooling system reduces a temperature of the surface 122 of the conduit 102 at the impingement location 124. Additionally, the impingement location 124 may vary during one operation of the engine assembly 10 relative to subsequent operations of the engine assembly 10. For example, shockwaves hit the surfaces 126, 128 at random locations and/or at random times, during operation of the engine assembly 10.

In one or more embodiments, the passages may change between being inlet passages to being outlet passages based on the different impingement locations where the shockwaves may impinge on the surface. For example, the passage 140A may be an inlet passage that directs gas toward the heat exchanger in one embodiment, and alternatively the passage 140A may be an outlet passage that directs gas toward the conduit based on the impingement location. The random locations and/or times that the shockwaves may impinge on the surface during operation of the engine assembly 10 may change whether the passages are inlet or outlet passages. For example, the shockwaves change a pressure of the gas within the conduit. For example, a portion of the gas that is downstream of the shockwave may have a pressure that is greater than a portion of the gas that is upstream of the shockwave. The higher or greater pressure of the portion of the gas that is downstream of the shockwave may cause the portion of the gas that is downstream of the shockwave to move toward the passage and toward the heat exchanger. Alternatively, the reduced or lower pressure of the portion of the gas that is upstream of the shockwave may cause the portion of the gas that is upstream of the shockwave to move away from the passage and away from the heat exchanger.

In one or more embodiments, the shockwaves 118 may promote boundary layer separation of one or more surfaces of the conduit, such as inner surfaces 112, 122. The promotion of movement of the gas into the inlet passage 140A and out of the outlet passage 140B (e.g., a suction motion of fluid into the passageways downstream of a shockwave 118) may mitigate boundary layer separation. For example, the suction of the gas into the inlet passage 140A directs or pulls the gas toward the inner surfaces 112, 122.

The shockwaves 118 change pressure of the gas within the conduit 102 where the shockwaves 118 impinge on the surfaces 126, 128. For example, the gas at an area downstream of an impingement location has a pressure that is greater than a pressure of the gas at an area upstream of the impingement location along the direction 114. For example, the gas proximate the inlet passage 140A that is downstream of the impingement location 124 has a pressure that is greater than a pressure of the gas proximate the outlet passage 140B that is upstream up the impingement location 124. The increased pressure of the gas downstream of the impingement location 124 encourages a portion of the gas to be directed into the inlet passage 140A. The portion of the gas directed into the inlet passage 140A is directed through the passageway 132 where the gas exchanges heat with the cooling fluid that moves within the passageway 134 of the heat exchanger 130. For example, the portion of the gas that is directed into the heat exchanger 130 via the inlet passage 140A has a temperature that is greater than (e.g., is hotter than) the portion of the gas that is directed out of the outlet passage 140B.

FIG. 3 illustrates a top view of the conduit 102 of the cooling system 100. The surface 128 includes plural passages 140 that are openings within the surface 128 that direct gas from the conduit 102 toward the heat exchanger 130, and direct gas from the heat exchanger 130 toward the conduit 102. In the illustrated embodiment, the cooling system 100 includes a patterned array of passages 140. Each of the passages 140 have a uniform shape and size. For example, the passages 140 may be slots or rectangular openings, but alternatively may have any alternative shape and/or size.

One or more of the passages 140 may be inlet passages, and one or more of the passages 140 may be outlet passages. As one example, the passages 140 disposed in a first column 302 may be inlet passages, and the passages 140 disposed in a second column 304 (e.g., between the upstream and downstream ends 104, 106) may be outlet passages. The passages 140 may be arranged in a patterned array of columns such that every other column includes inlet passages 140A, and the other columns include outlet passages 140B. Optionally, a first passage in the column 302 may be an inlet passage 140A, and a second passage in the column 302 may be an outlet passage 140B. Additionally or alternatively, the different passages of the column 302 may have a shape and/or size that is different than a shape and/or size of the passages of the column 304. Optionally, each of the passages of the column 302 may have a shape and/or size that is unique relative to a shape and/or size of the other passages of the column 302.

FIG. 4A illustrates a top view of a conduit of a cooling system 400 in accordance with another embodiment, and FIG. 4B illustrates a cross-sectional view of the cooling system 400 shown in FIG. 4A. The conduit 102 includes a patterned array of plural passages 440 that have a substantially circular cross-sectional shape. In alternative embodiments, a first row of passages may have a uniform shape and/or size, and a second row of passages may have an alternative uniform shape and/or size. Optionally, the cooling system 100 may include any number of passages having any uniform and/or unique shape, size, orientation, confirmation, or the like, relative to each other passage.

At least one impingement location 124 is illustrated in FIG. 4A. The passages 140 downstream of the impingement location 124 direct the gas from the conduit toward the heat exchanger, and the passages 140 upstream of the impingement location 124 direct the gas from the heat exchanger toward the conduit. The cooling system 400 includes plural structures, such as channels 150. In the illustrated embodiment, the channels 150 extend longitudinally and are substantially parallel with the direction 114 of the flow of gas within the conduit. The gas may be directed in one or more directions within the heat exchanger based on the orientation and configuration of the channels 150 that may be fluidly coupled and/or fluidly separate from each other in any combination. Additionally or alternatively, the channels 150 may direct the gas in one or more directions within the surface of the conduit, and may fluidly separate the gas from cooling fluid 155 that moves in other passageways of the heat exchanger.

FIG. 5A illustrates a top view of another example of a conduit of a cooling system 450, and FIG. 5B illustrates a cross-sectional view of the cooling system 450 shown in FIG. 5B. The cooling system 450 includes plural walls 460 that extend longitudinally and are substantially parallel with the direction 114 of the flow of the gas within the conduit. The walls may direct the gas in one or more directions inside the heat exchanger, and may fluidly coupled and/or fluidly separate one or more passages 140 with each other. Additionally, the walls 160 may fluidly separate the gas from the cooling fluid 155 that moves in other passageways of the heat exchanger. Optionally, the heat exchanger may have any alternative structures that may direct the flow or movement of the gas and the cooling fluid in one or more directions within the heat exchanger. In the illustrated embodiment of FIGS. 5A and 5B, the cooling fluid is disposed below the gas. Optionally, the walls may direct the gas and the cooling fluid such that the gas is directed below the cooling fluid, or such that the gas and the cooling fluid may be intertwined with each other and fluidly separate from each other, or the like.

In one or more embodiments, one or more structures, channels, walls, unit cells, passageways, passages, or the like, of the heat exchanger 130 and/or the conduit 102 of the cooling system 100 may be manufactured additively. Additively manufacturing the conduit 102 and/or one passageways, unit cells, or the like, of the heat exchanger 130 may allow the cooling passageways, the unit cells, the passages, or the like, of the cooling system 100 to have any three-dimensional shapes and/or multi-domain cooling techniques inside the one or more surfaces of the conduit 102. As one example, additive manufacturing can involve joining or solidifying material under computer control to create a three-dimensional object, such as by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the cooling assembly 300 can be formed in another manner.

A portion of the gas in the conduit 102 may be directed into the heat exchanger 130 via one or more inlet passages (e.g., 140A shown in FIG. 2). The gas is directed into one or more passageways of the heat exchanger 130 (e.g., passageway 132) to flow in one or more directions within the heat exchanger 130. The heat exchanger 130 includes plural unit cells that are fluidly coupled with each other unit cell and with the plural passageways to direct the gas in one or more directions within the heat exchanger 130, and to direct the cooling fluid in one or more directions within the heat exchanger 130. As one example, the plural unit cells may be structures, or a pattern of structures, with symmetry that enable the unit cells to be replicated in multiple directions to form a system of unit cells. The unit cells may be replicated in the x, y, and/or z directions in a cartesian coordinate system. FIGS. 6 through 12 illustrate different examples of embodiments of the unit cells that may be fluidly coupled with each other within the heat exchanger 130.

Figure 6:
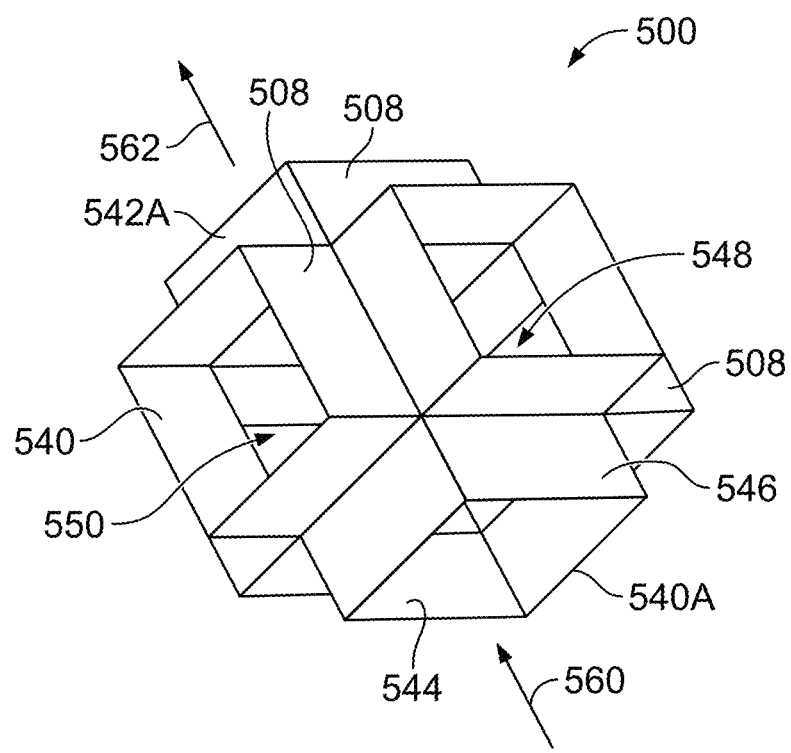
FIG. 6 illustrates an isometric view of a unit cell in accordance with one embodiment.
Figure 7:
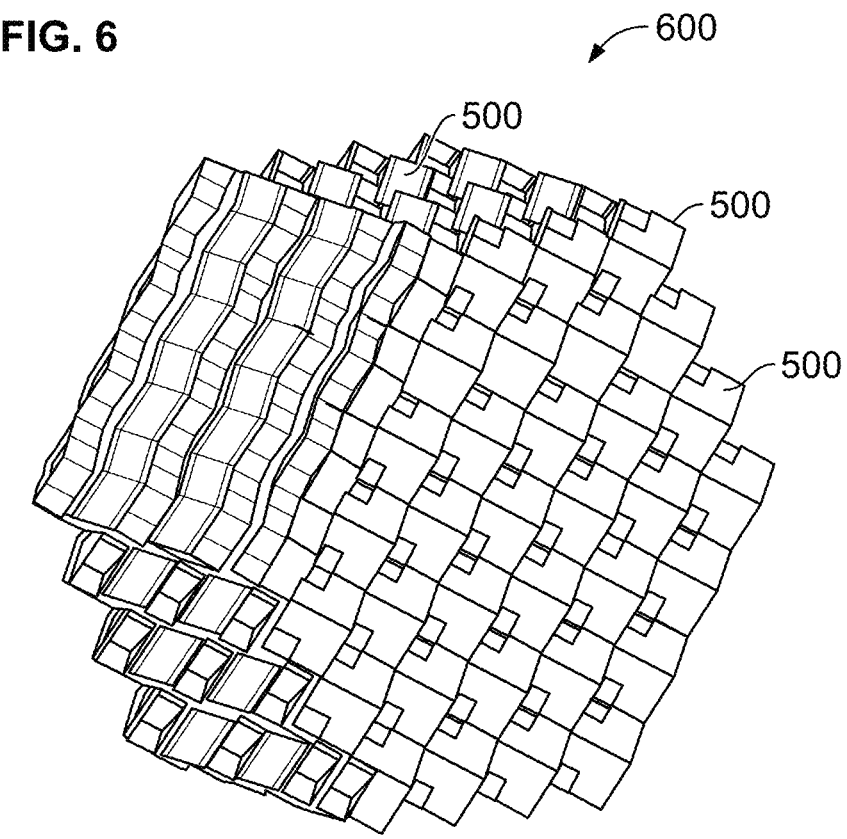
FIG. 7 illustrates a system including a plurality of the unit cells shown in FIG. 6.

For example, FIG. 6 illustrates an isometric view of a unit cell 500, and FIG. 7 illustrates a system 600 including a plurality of the unit cells 500 in accordance with one embodiment. The unit cells 500 may be referred to as planar trifurcation unit cells. Optionally, the planar trifurcation unit cells 500 may be nested with each other, thereby being a system of planar nested trifurcation unit cells (not shown).

Each of the unit cells 500 includes a sidewall 508 defining a plurality of unit cell inlets 540, a plurality of unit cell outlets 542, an interior surface 544, and an exterior surface 546. In one or more embodiments, the gas may move or flow through the unit cell along the interior surfaces 544 or outside of the exterior surfaces 546 of the unit cell 500, and the cooling fluid may move or flow over the other of the interior surfaces 544 or the exterior surfaces 546 of the unit cell 500. For example, the gas may flow inside the unit cells 500 along the passageways formed by the system 600 of the plural unit cells 500, and the cooling fluid may flow outside the unit cells 500, such that the unit cells fluidly separate the gas and the cooling fluid. Optionally, the gas may flow outside of the unit cells 500, and the cooling fluid may flow or move inside the unit cells 500. Optionally, the system 600 may have plural unit cells 500 that direct gas along the interior surfaces along a portion of the unit cells, and direct the gas along the exterior surfaces along a different portion of the unit cells. Optionally, the system 600 may direct the cooling fluid and the gas in any different directions.

One of the unit cell inlets 540A may direct fluid in a direction 560 into the unit cell 500, and one of the unit cell outlets 542A may direct some of the fluid in a direction 562 out of the unit cell 500. In the illustrated embodiment, each unit cell 500 includes three unit cell inlets 540 and three unit cell outlets 542. Optionally, the unit cell 500 may include any number of inlets and any number of outlets. Optionally, the number of inlets may be different than the number of outlets.

In one or more embodiments, each of the unit cell inlets 540 may be fluidly coupled with each of the unit cell outlets 542. Alternatively, one or more of the unit cell inlets 540 may be fluidly coupled with one of the unit cell outlets 542, and may be fluidly separate from another of the unit cell outlets 542. Optionally, the unit cell 500 may have any alternative configuration that may fluidly couple one or more inlets 540 with one or more outlets 542 and may fluidly separate one or more inlets 540 from one or more outlets 542.

The sidewalls 508 of the unit cell 500 may also define passageways, such as passageways 548, 550 illustrated in FIG. 6. The passageways 548, 550 of two or more unit cells 500 may be fluidly coupled with each other in the system 600. For example, plural unit cells 500 may be formed and/or coupled together such that the passageways 548, 550 may be fluidly coupled together within the passageway 134 and/or the passageway 132 shown in FIG. 2. The plural passageways of the unit cell 500 may direct the fluid (e.g., the gas or the cooling fluid) in different directions such that the passageways furcate the fluid to move in different directions within and/or out of the unit cell 500. In one or more embodiments, the fluid may be directed into the unit cell 500 via the unit cell inlet 540A, and the unit cell 500 may trifurcate the fluid to flow in along three different flow paths toward three different unit cell outlets 542.

The system 600 illustrated in FIG. 7 includes plural unit cells 500 that are coupled together. The system 600 may illustrate a group of the unit cells 500 that may be formed within the passageways 132, 134. For example, the gas or the cooling fluid may be directed through one or more unit cells 500 within the passageways 132, 134, respectively. In one or more embodiments, the cooling fluid may be directed through one or more unit cells 500 of the system 600, and the gas may be directed through other unit cells 500 of the system 600. As one example, the unit cells 500 through which the cooling fluid is directed may have a configuration that provides a co-flow arrangement relative to the configuration of the unit cells 500 through which the gas is directed. Optionally, the configurations of the unit cells 500 may provide a counterflow arrangement, a crossflow arrangement, or the like.

Additionally or alternatively, the configuration of the flow path of the gas may be based on the configuration of the flow path of the cooling fluid. For example, the flow paths of the gas and the cooling fluid may be determined to increase an amount of heat transfer from the gas to the cooling fluid. Additionally, the furcated shapes of the unit cell 500 may provide additional surface area in order to facilitate heat exchange between the gas and the cooling fluid. For example, the furcated shapes may increase a surface area of the unit cells through which the gas or the cooling fluid flows in order to increase the amount of thermal energy that may transfer from the gas to the cooling fluid.

Figure 8:
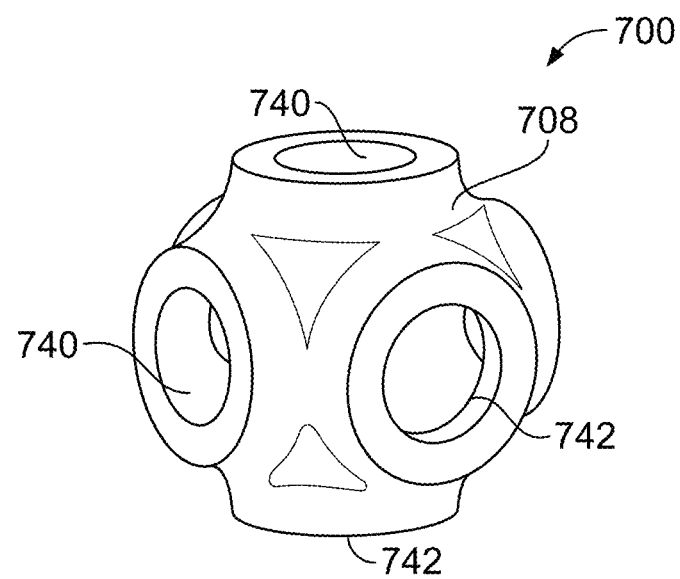
FIG. 8 illustrates an isometric view of a unit cell in accordance with one embodiment.
Figure 9:
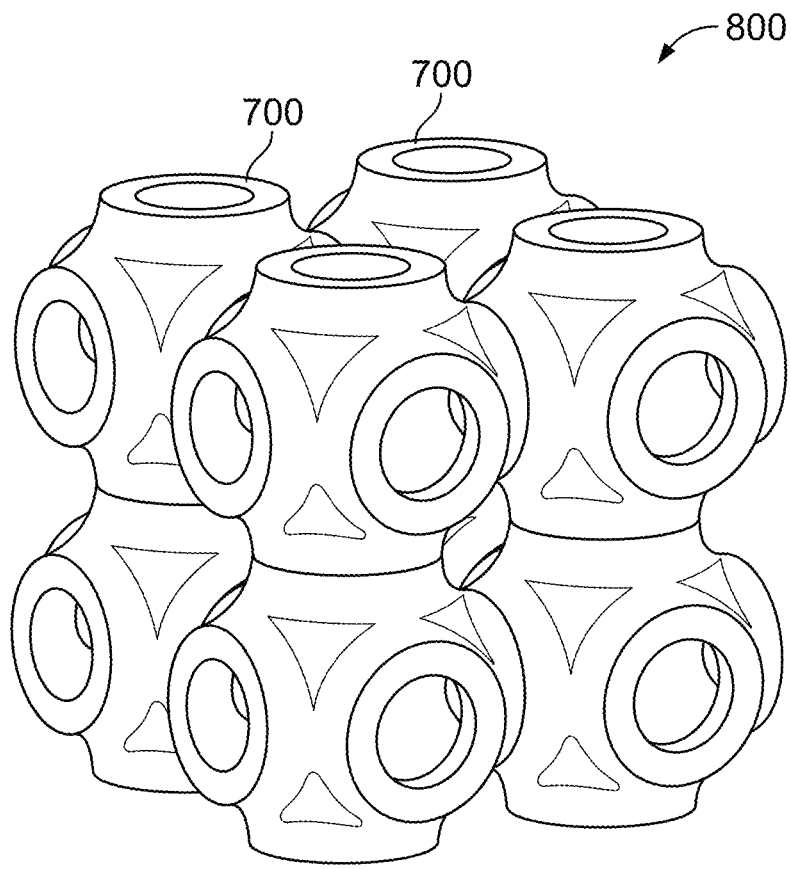
FIG. 9 illustrates a system including a plurality of the unit cells shown in FIG. 8.

FIG. 8 illustrates an isometric view of a unit cell 700, and FIG. 9 illustrates a system 800 including a plurality of the unit cells 700 in accordance with one embodiment. The unit cells 700 may also be referred to as rounded trifurcating unit cells. Optionally, the rounded trifurcating unit cells may be nested with each other, thereby being a system of rounded nested trifurcation unit cells (not shown).

Similar to the unit cell 500 illustrated in FIG. 6, the unit cell 700 includes plural sidewalls 708 that may be arranged to form plural unit cell inlets 740, plural unit cell outlets 742, and one or more passageways that may direct the gas or the cooling fluid within the unit cell 700. In one or more embodiments, the cooling fluid may move or flow through the inlets 740, and the gas may move or flow through the outlets 742. Optionally, the cooling fluid may move into the unit cell via one or more of the inlets 740 and out of the unit cell via one or more of the outlets 742, and the gas may move or flow along exterior surfaces of the unit cell 700 such that the cooling fluid and the gas are fluidly separate from each other within the system 800. For example, the cooling fluid may move within the unit cells 700 along the passageways formed by the system 800 of plural unit cells fluidly coupled with each other, and the gas may move outside of the unit cells 700. Optionally, the system 800 may have any alternative configuration of the plural unit cells 700 to direct the cooling fluid and the gas in any alternative directions.

The unit cell 500 furcates the flow of the fluid (e.g., the gas or the cooling fluid) at approximately 90° angles in plural directions. Alternatively, the unit cell 700 has a shape that furcates the fluid at different angles. For example, the unit cell 500 has a substantially cubical shape, and the unit cell 700 has a circular shape.

In one or more embodiments, the system 800 may include one or more unit cells 500 and one or more different unit cells 700, and the different unit cells 500, 700 may have any arrangement relative to each other within the system 800. As another example, the passageway 132 shown in FIG. 2 that directs the gas may include plural unit cells 500 coupled or formed together as the system 600, and the passageway 134 that directs the cooling fluid may include plural unit cells 700 coupled or formed together as the system 800. Optionally, the passageways 132, 134 may consist of portions of the system 600 and portions of the system 800, and the passageways 132, 134 that may direct the gas and the cooling fluid, respectively, in any co-flow arrangement, counterflow arrangement, crossflow arrangement, parallel-flow arrangement, a combination of two or more arrangements, or the like, to meet overall system requirements and to increase an amount of thermal energy transferred between the gas and the cooling fluid.

Figure 10:
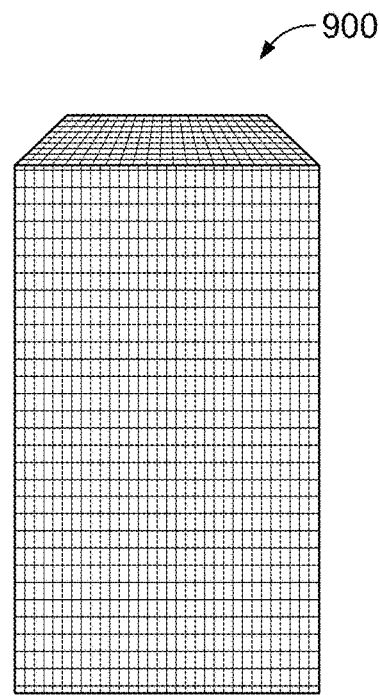
FIG. 10 illustrates a side view of a heat exchanger in accordance with one embodiment.
Figure 11:
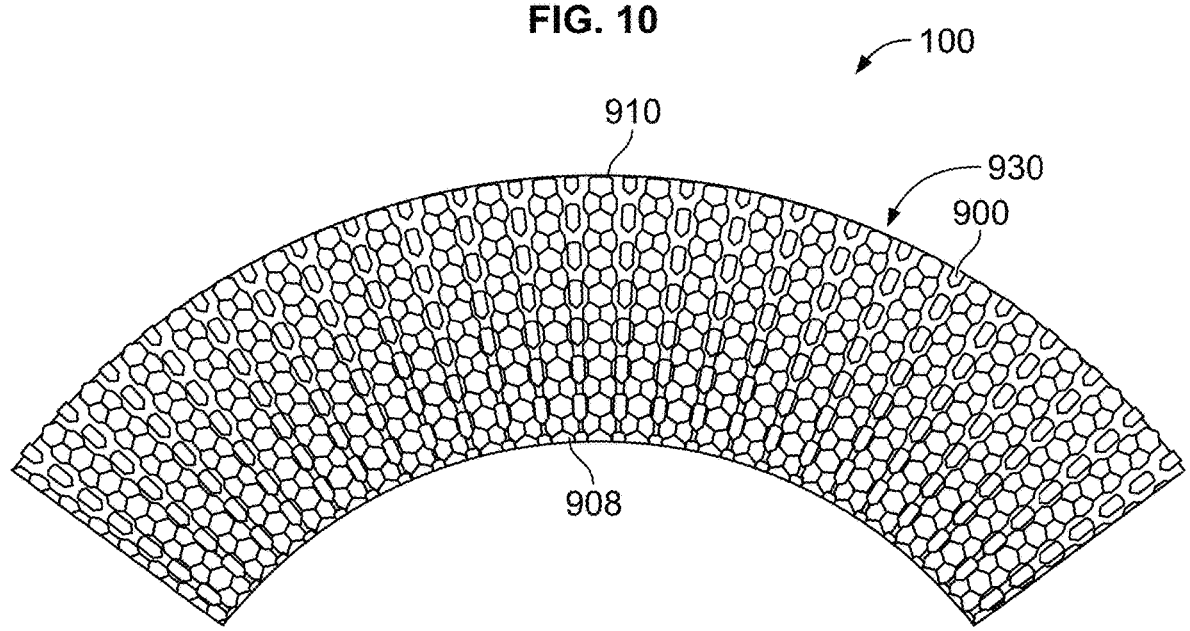
FIG. 11 illustrates a sectional view of a heat exchanger core of the heat exchanger shown in FIG. 10.

FIG. 10 illustrates a side view of a heat exchanger 930 in accordance with one embodiment. FIG. 11 illustrates a sectional view of a heat exchanger core 1000 of the heat exchanger 930. The heat exchanger 930 includes a plurality of unit cells 900. The unit cells 900 are arranged along an arc such that the unit cells 900 maintain a substantially uniform spacing between a first surface 908 and a second surface 910. The unit cells 900 conform to the shape of the heat exchanger core 1000. As a result, the unit cells 900 of the heat exchanger 930 may have a desired shape for a specific system and/or application. For example, the unit cells 900 may conform to the shape of the surface 128 of the conduit 102, to the shape of a portion of the surface 128, to the shape of another surface of the conduit 102, or the like. In one or more embodiments, the unit cells 900 may have a linear arrangement, the unit cells 900 may have a non-linear arrangement, or the unit cells 900 may have an arrangement that may include a portion of the cells having a linear arrangement and another portion of the unit cells having a non-linear arrangement.

Optionally, the heat exchanger core 1000 may have any alternative shape that may promote flow of the gas and the cooling fluid in one or more directions. As one example, the heat exchanger core 1000 may promote a radial parallel flow configuration such that the gas and/or the cooling fluid flow from the inner surface 908 toward the outer surface 910. Optionally, the core 1000 may promote a radial counter-flow configuration such that a portion of the gas may flow from the inner surface 908 toward the outer surface 910, and another portion of the gas may flow from the outer surface 910 toward the inner surface 908. Optionally, the core 1000 may promote the gas and/or the cooling fluid to flow in a circumferential parallel flow. For example, the gas may flow at least partially along a curved path between the inner surface 908 and the outer surface 910 about an axis of the core (not shown). Optionally, the core 1000 may promote the gas and/or the cooling fluid to flow in a circumferential counter-flow configuration. For example, a first portion of the gas may flow along a curved path in a clockwise direction, and a second portion of the gas may flow along the curved path in a counter-clockwise direction.

Figure 12:
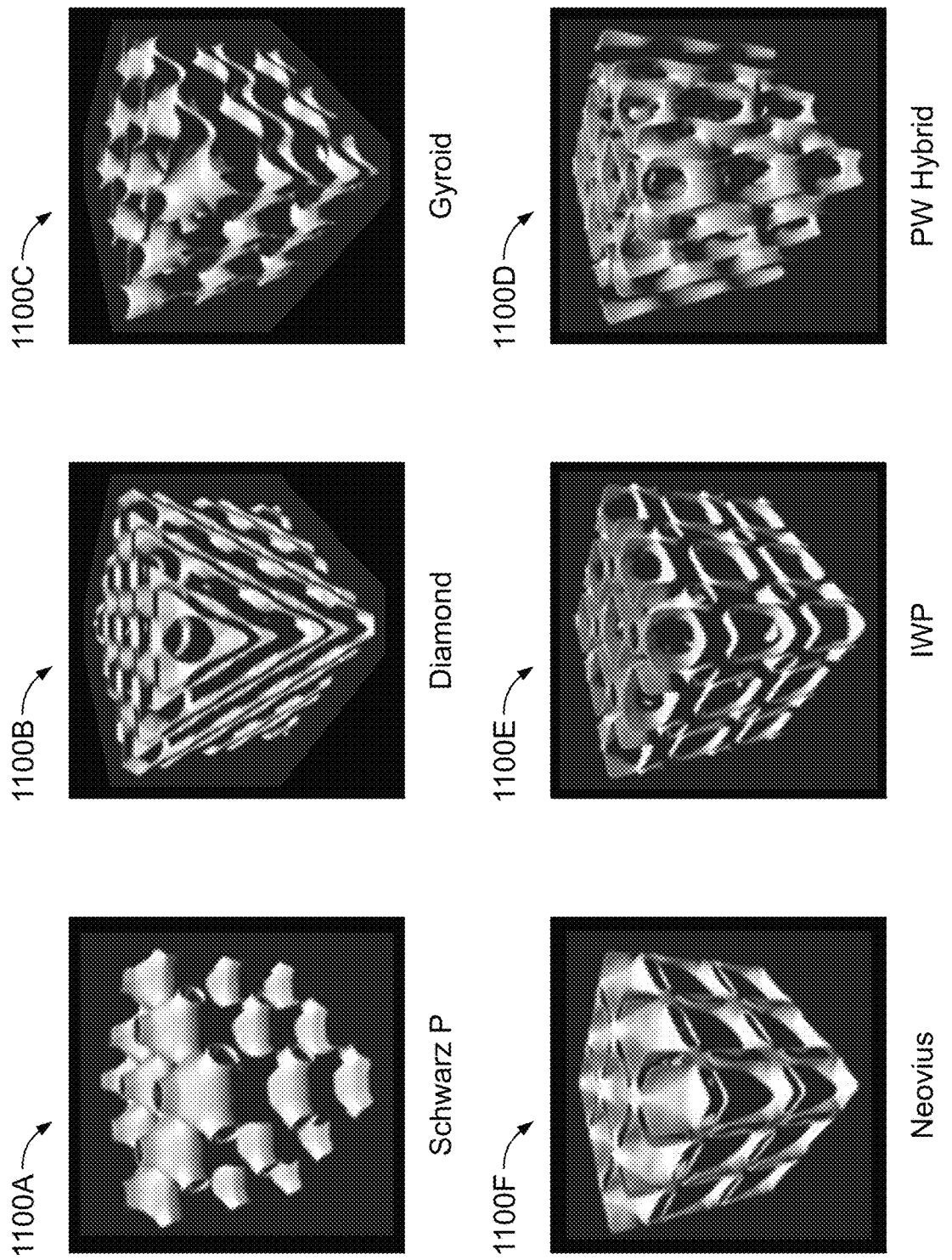
FIG. 12 illustrates plural unit cells in accordance with one embodiment.

FIG. 12 illustrates plural unit cells in accordance with one embodiment. The unit cells 1100A-1100F illustrate various shapes, sizes, orientations, or the like, of unit cells that may direct the gas in one or more directions within the passageway 132, and that may direct the cooling fluid in one or more directions within the passageway 134. For example, the unit cell 1100A may be referred to as a Schwarz P design unit cell, the unit cell 1100B may be referred to as a Diamond design unit cell, the unit cell 1100C may be referred to as a Gyroid design unit cell, the unit cell 1100D may be referred to as a PW Hybrid design unit cell, the unit cell 1100E may be referred to as an IWP design unit cell, and the unit cell 1100F may be referred to as a Neovius design unit cell. Optionally, the unit cells may be planar trifurcation unit cells, nested trifurcating unit cells, rounded trifurcating unit cells, rounded nested trifurcating unit cells, or the like. In one or more embodiments, one or more of the unit cells of the heat exchanger 130 may also include one or more structures that may extend into a flow path formed by the unit cells. For example, one or more of the unit cells may include parallel fins, helical strakes, pin fins, or the like, that may extend into the flow path of the gas and/or the cooling fluid. The one or more structures may change a direction of movement of the gas and/or the cooling fluid within the heat exchanger 130. Additionally, the one or more structures may change an amount of surface area of the unit cells and increase an amount of thermal energy the unit cell may transfer.

Returning to FIG. 2, a portion of the gas having a first temperature is directed from the conduit 102 into the heat exchanger 130 via at least one of the inlet passages 140A. The gas exchanges thermal energy with the cooling fluid within the heat exchanger 130, and the gas having a cooler or reduced temperature is directed back into the conduit 102 via at least one of the outlet passages 140B. For example, the portion of the gas that is directed out of the heat exchanger 130 is cooler than the portion of the gas that is directed into the heat exchanger 130. Optionally, the heat exchanger 130 may change a pressure of the gas, such as by decreasing the pressure. For example, a portion of the gas that is directed out of the heat exchanger 130 may have a pressure that is less than a pressure of the portion of the gas that is directed into the heat exchanger 130.

Figure 13:
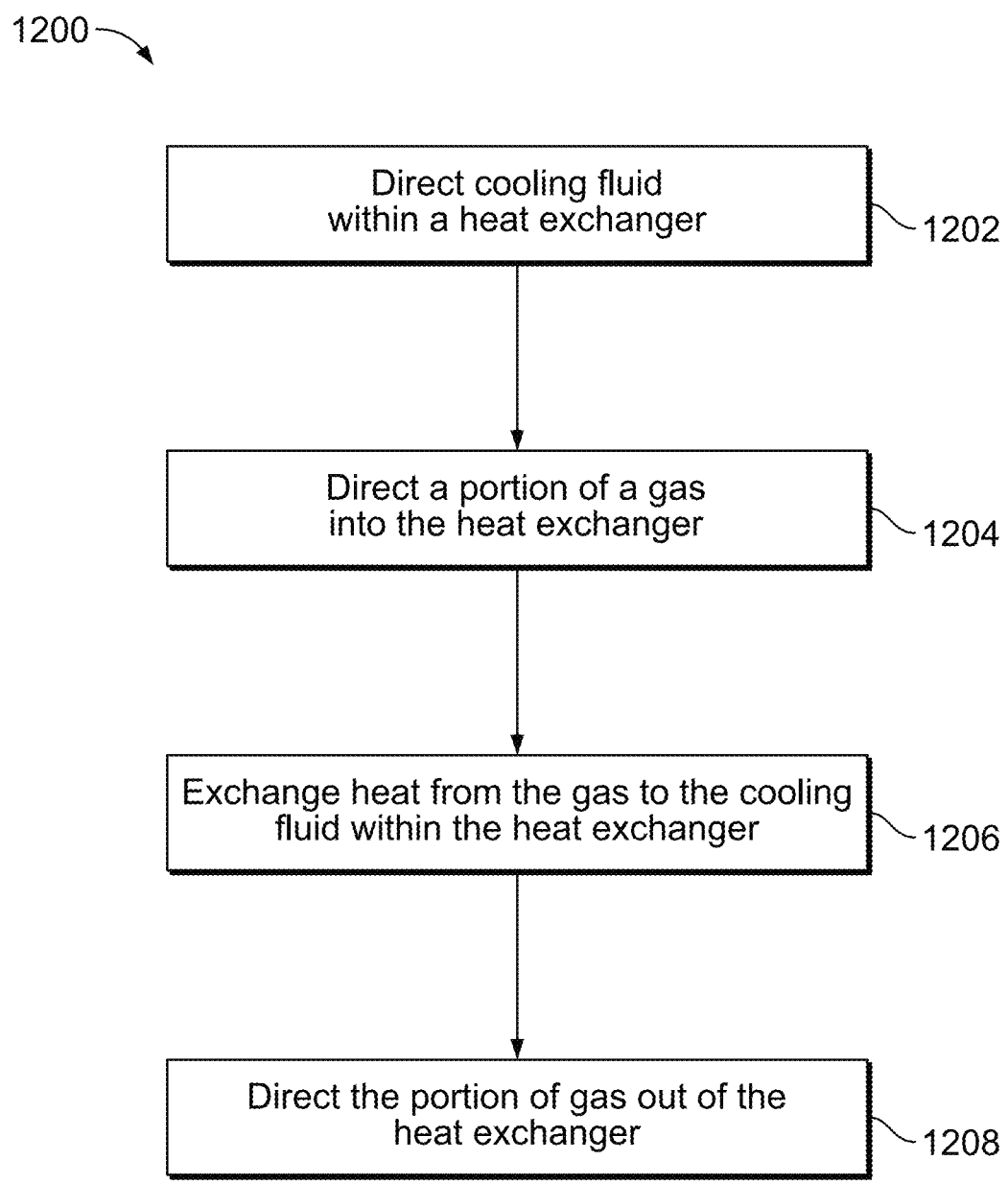
FIG. 13 illustrates a flowchart of a method of cooling a gas with a cooling fluid in accordance with one embodiment.

FIG. 13 illustrates a flowchart of a method 1200 of cooling a gas with a cooling fluid in accordance with one embodiment. A cooling system may include at least a conduit and a heat exchanger disposed within a surface of the conduit. The heat exchanger may be additively manufactured or formed within a conduit. The heat exchanger may include at least two passageways that are fluidly separate from each other that direct gas and a cooling fluid within the heat exchanger. At least one unit cell may be disposed along one or more of the passageways to change direction of flow of the gas and/or the cooling fluid within the heat exchanger.

At 1202, a cooling fluid is directed in one or more directions along one or more of plural passageways within a heat exchanger. The cooling fluid may be fuel that may be used to power the engine system, or any alternative cooling fluid. The heat exchanger may be disposed within at least one surface of a conduit that retains a gas. In one or more embodiments, the conduit is disposed within an engine system, such as a scramjet engine system. For example, the conduit may be disposed within an inlet of the engine system, within an isolator of the engine system, within a combustor of the engine system, or within any combination of two or more therein.

The cooling fluid may move within one or more passageways of the heat exchanger. Optionally, the one or more passageways may be fluidly coupled with one or more unit cells that may change a direction of movement of the cooling fluid within the heat exchanger. Optionally, the passageways may include one or more structures that may change a direction of movement of the cooling fluid within the heat exchanger.

At 1204, a portion of a gas is directed into the heat exchanger. The gas may be ambient air, nitrogen, argon, or the like. The portion of the gas is directed into the heat exchanger from the conduit via one or more inlet passages. At least one inlet passage may be disposed at a position that is downstream of an impingement location where a supersonic engine-generated shockwave may impinge on the surface of the conduit. In one or more embodiments, the position of the inlet passage downstream of the impingement location may promote movement of the gas toward the inlet passage, such that the gas may be pulled or sucked towards and into the inlet passage. The promotion of movement of the gas into the inlet passage may mitigate boundary layer separation caused by the shockwaves impinging on the inner surfaces of the conduit.

The gas may move in one or more directions within one or more other passageways of the heat exchanger. For example, the passageways through which the cooling fluid moves within the heat exchanger may be fluidly separate from the passageways through which the gas moves within the heat exchanger. Optionally, the one or more passageways of the gas may include one or more unit cells that may change a direction of movement of the gas within the heat exchanger. Optionally, the passageways may include one or more structures that may change a direction of movement of the gas within the heat exchanger.

At 1206, thermal energy is exchanged from the gas to the cooling fluid. For example, the cooling fluid reduces a temperature of the gas within the heat exchanger. The cooling fluid may have a flow path that produces a co-flow arrangement, a counterflow arrangement, a cross-flow arrangements, or the like, between the cooling fluid and the gas. For example, the flow path of the cooling fluid relative to the flow path of the gas may change an amount of thermal energy that may be transferred from the gas to the cooling fluid.

At 1208, the portion of the gas is directed out of the heat exchanger and toward the conduit via one or more outlet passages. The portion of the gas that is directed out of the heat exchanger is cooler, or has a lower temperature relative to a temperature of the portion of the gas that is directed into the heat exchanger. Additionally, the portion of the gas that is directed out of the heat exchanger to the conduit has a pressure that is less than or lower than a pressure of the gas that is directed into the heat exchanger from the conduit.

In one or more embodiments, the cooler gas that is directed out of the heat exchanger and into the conduit may provide a thermal barrier or protective layer of coolant, a film of coolant, or the like, along one or more inner surfaces of the conduit. For example, the cooler fluid directed out of the heat exchanger may act as a barrier between the shockwave and the surfaces of the conduit, and may reduce a strength of the shockwave that may impinge on the surface relative to the cooler fluid not acting as a protective layer of coolant.

In one or more embodiments, a cooling system includes a conduit extending from an upstream end to a downstream end and retains a gas. A heat exchanger is fluidly coupled with and disposed within a surface of the conduit. A portion of the gas is directed into the heat exchanger via one or more passages extending between the conduit and the heat exchanger, and a portion of the gas is directed out of the heat exchanger via the one or more passages. The heat exchanger directs cooling fluid in one or more directions within the heat exchanger along one or more passageways of plural passageways. The heat exchanger directs the portion of the gas in one or more directions within the heat exchanger along one or more other passageways of the plural passageways. The heat exchanger cools the gas by exchanging heat from the gas to the cooling fluid within the heat exchanger.

Optionally, the heat exchanger includes plural unit cells fluidly coupled with each other to form the plural passageways within the heat exchanger.

Optionally, the plural unit cells change a direction of movement of the gas within the heat exchanger, and change a direction of movement of the cooling fluid within the heat exchanger.

Optionally, the plural unit cells may include one or more of planar trifurcation unit cells, nested trifurcating unit cells, rounded trifurcating unit cells, rounded nested trifurcating unit cells, Schwarz P design unit cells, diamond design unit cells, gyroid design unit cells, PW hybrid design unit cells, IWP design unit cells, or Neovius design unit cells.

Optionally, the conduit may receive a supersonic engine-generated shockwave that impinges on the surface of the conduit at an impingement location.

Optionally, at least one of the one or more passages is an inlet passage that is an opening of the surface at a position that is downstream of the impingement location.

Optionally, at least one of the one or more passages is an outlet passage that is an opening of the surface at a position that is upstream of the impingement location.

Optionally, the cooling system may reduce a temperature of the surface of the conduit at the impingement location.

Optionally, the heat exchanger may cool the gas such that the portion of the gas that is directed out of the heat exchanger is cooler than the portion of the gas directed into the heat exchanger.

Optionally, the cooling system may include one or more inlet passages and one or more outlet passages. The one or more inlet passages may direct a portion of the gas from the conduit toward the heat exchanger, and the one or more outlet passages may direct a portion of the gas from the heat exchanger toward the conduit.

Optionally, the heat exchanger may direct the gas and the cooling fluid in one or more of a cross-flow arrangement, a counter-flow arrangement, or a co-flow arrangement.

Optionally, the portion of the gas directed into the heat exchanger via the one or more passages may reduce an amount of boundary layer separation between the gas and the surface of the conduit.

In one or more embodiments, a method includes directing cooling fluid in one or more directions within a heat exchanger along one or more of plural passageways of the heat exchanger. The heat exchanger is disposed within a surface of a conduit extending from an upstream end to a downstream end. The conduit retains a gas. Heat is exchanged from the gas to the cooling fluid within the heat exchanger. A portion of the gas is directed into the heat exchanger via one or more passages extending between the conduit and the heat exchanger, and a portion of the gas is directed out of the heat exchanger via the one or more passages. The heat exchanger directs the gas in one or more directions within the heat exchanger along one or more other passageways of the plural passageways.

Optionally, the heat exchanger includes plural unit cells fluidly coupled to each other to form the plural passageways within the heat exchanger.

Optionally, the conduit may receive a supersonic engine-generated shockwave that impinges on the surface of the conduit at an impingement location.

Optionally, at least one of the one or more passages is an inlet passage that is an opening of the surface at a position that is downstream of the impingement location.

Optionally, at least one of the one or more passages is an outlet passage that is an opening of the surface at a position that is upstream of the impingement location.

Optionally, a temperature of the surface of the conduit at the impingement location may be reduced.

Optionally, the method may include cooling the gas such that the portion of the gas that is directed out of the heat exchanger is cooler than the portion of the gas directed into the heat exchanger.

In one or more embodiments, a cooling system includes a conduit extending from an upstream end to a downstream end and retains a gas. A heat exchanger is fluidly coupled with and disposed within a surface of the conduit. The heat exchanger includes plural unit cells fluidly coupled with each to form plural passageways within the heat exchanger. An inlet passage extends between the conduit and the heat exchanger and directs the gas from the conduit toward the heat exchanger. An outlet passage extends between the conduit and the heat exchanger and directs the gas from the heat exchanger toward the conduit. The heat exchanger directs cooling fluid in one or more directions within the heat exchanger along one or more passageways of the plural passageways, and directs the gas in one or more directions within the heat exchanger along one or more other passageways of the plural passageways. The conduit receives a supersonic engine-generated shockwave that impinges on the surface of the conduit at an impingement location. The inlet passage is an opening of the surface at a position that is downstream of the impingement location, and the outlet passage is an opening of the surface at a position that is upstream of the impingement location.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system comprising:
    a wall defining a conduit extending from an upstream end to a downstream end, the conduit configured to retain a gas; and
    a heat exchanger fluidly coupled with and disposed within a surface of the wall, the heat exchanger having one or more passages fluidly coupled to the conduit and a plurality of internal passages fluidly coupled to the one or more passages;
    wherein:
        the one or more passages extending between the conduit and the heat exchanger are configured to direct at least a portion of the gas into and out of the heat exchanger,
        the plurality of internal passages are configured to direct a cooling fluid and at least a portion of the gas in one or more directions within the heat exchanger;
        the heat exchanger is configured to cool the gas within the plurality of internal passages by exchanging heat from the gas within the plurality of internal passages to the cooling fluid within the heat exchanger; and
        the conduit is configured to receive a supersonic engine-generated shockwave that impinges on the surface of the conduit at an impingement location.

2. The cooling system of claim 1, wherein at least one of the one or more passages is an inlet passage that is an opening of the surface at a position that is downstream of the impingement location.

3. The cooling system of claim 1, wherein at least one of the one or more passages is an outlet passage that is an opening of the surface at a position that is upstream of the impingement location.

4. The cooling system of claim 1, wherein the cooling system is configured to reduce a temperature of the surface of the conduit at the impingement location.

5. An engine assembly comprising:
    a cooling system comprising:
        a wall defining a conduit extending from an upstream end to a downstream end, the conduit configured to retain a gas; and
        a heat exchanger fluidly coupled with and disposed within a surface of the wall, the heat exchanger having one or more passages fluidly coupled to the conduit and a plurality of internal passages fluidly coupled to the one or more passages, the plurality of internal passages provided exterior of the conduit;
        wherein the one or more passages extending between the conduit and the heat exchanger are configured to direct at least a portion of the gas into and out of the heat exchanger,
        wherein the plurality of internal passages are configured to direct a cooling fluid and at least a portion of the gas in one or more directions within the heat exchanger; and
    wherein the heat exchanger is configured to cool the gas within the plurality of internal passages by exchanging heat from the gas within the plurality of internal passages to the cooling fluid within the heat exchanger.

6. The engine assembly of claim 5, wherein the heat exchanger includes plural structures fluidly coupled to each other to form the plurality of internal passages within the heat exchanger.

7. The engine assembly of claim 6, wherein the plural structures are configured to change a direction of movement of the gas within the heat exchanger, and change a direction of movement of the cooling fluid within the heat exchanger.

8. The engine assembly of claim 6, wherein the plural structures include one or more of planar trifurcation unit cells, nested trifurcating unit cells, rounded trifurcating unit cells, rounded nested trifurcating unit cells, Schwarz P design unit cells, diamond design unit cells, gyroid design unit cells, PW hybrid design unit cells, IWP design unit cells, or Neovius design unit cells.

9. The engine assembly of claim 5, wherein the heat exchanger is configured to cool the gas such that the portion of the gas that is directed out of the heat exchanger is cooler than the portion of the gas directed into the heat exchanger.

10. The engine assembly of claim 5, wherein the cooling system one or more inlet passages and one or more outlets passages, the one or more inlet passages configured to direct a portion of the gas from the conduit toward the heat exchanger, and the one or more outlet passages configured to direct a portion of the gas from the heat exchanger toward the conduit.

11. The engine assembly of claim 5, wherein the heat exchanger is configured to direct the gas and the cooling fluid in one or more of a cross-flow arrangement, a counter-flow arrangement, or a co-flow arrangement.

12. The engine assembly of claim 6, wherein the plural structures include one or more of planar trifurcation unit cells or nested trifurcating unit cells.

13. The engine assembly of claim 12, wherein the plural structures include planar trifurcation unit cells.

14. The engine assembly of claim 5, wherein the one or more passages include a rectangular opening directly fluidly coupled to the conduit.

15. A cooling system comprising:
- a wall including a surface at least partially defining a conduit extending between an upstream end and a downstream end, the conduit having a flow of fluid; and
- a heat exchanger formed with the wall, the heat exchanger having:
  - a plurality of internal passages provided to direct the flow of fluid within the heat exchanger in one or more directions within the heat exchanger, the plurality of internal passages provided exterior of the conduit;
  - at least one inlet passage that extends through a portion of the wall, the at least one inlet passage fluidly coupling the plurality of internal passages to the flow of fluid within the conduit; and
  - at least one outlet passage extending through a portion of the wall and exhausting into at least a portion of the conduit, the at least one outlet passage defining an outlet for the plurality of internal passages.

16. The cooling system of claim 15, wherein the heat exchanger includes plural structures fluidly coupled to each other to form the plurality of internal passages.

17. The cooling system of claim 16, wherein the plural structures include one or more of planar trifurcation unit cells, nested trifurcating unit cells, rounded trifurcating unit cells, rounded nested trifurcating unit cells, Schwarz P design unit cells, diamond design unit cells, gyroid design unit cells, PW hybrid design unit cells, IWP design unit cells, or Neovius design unit cells.

18. The cooling system of claim 15, wherein the at least one inlet passage is included within a plurality of inlet passages spaced along the wall and the at least one outlet passage is included within a plurality of outlet passages spaced along the wall.

19. The cooling system of claim 16, wherein the plural structures include one or more of planar trifurcation unit cells or nested trifurcating unit cells.

20. The cooling system of claim 15, wherein the one or more passages include a rectangular opening directly fluidly coupled to the conduit.

\* \* \* \* \*